S. ARNOLD.
CASTING WEIGHT FOR FISHING LINES.
APPLICATION FILED OCT. 7, 1916.
1,232,167.
Patented July 3, 1917.
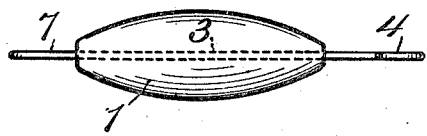
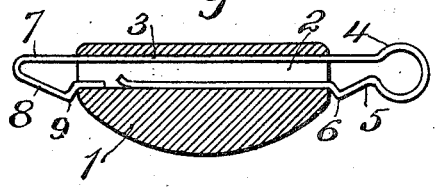
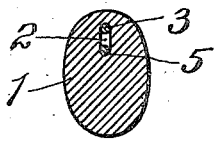
WITNESS:
R. E. Hamilton
INVENTOR.
Sigel Arnold
BY Warren D. House
His ATTORNEY

UNITED STATES PATENT OFFICE.

SIGEL ARNOLD, OF KANSAS CITY, MISSOURI.

CASTING-WEIGHT FOR FISHING-LINES.

1,232,167.     Specification of Letters Patent.     Patented July 3, 1917.

Application filed October 7, 1916. Serial No. 124,330.

*To all whom it may concern:*

Be it known that I, SIGEL ARNOLD, a citizen of the United States, residing at Kansas City, in the county of Jackson and State of Missouri, have invented a certain new and useful Improvement in Casting-Weights for Fishing-Lines, of which the following is a specification.

My invention relates to improvements in casting weights. It is particularly adapted for use in connection with fishing lines.

The object of my invention is to provide a casting weight which may be quickly attached or detached to or from a fishing line or hook, which will not be liable to accidental disengagement from the device to which it is attached, which is simple in construction, cheap to manufacture and efficient in operation, which is strong and durable and not liable to get out of order, and which will prevent the fishing line from becoming twisted during casting or trolling, or the lure becoming tangled.

The novel features of my invention are hereinafter fully described and claimed.

In the accompanying drawings which illustrate the preferred embodiment of my invention, Figure 1 is a top view of my improved casting weight.

Fig. 2 is a longitudinal vertical sectional view of the same.

Fig. 3 is a cross section of the same.

Similar characters of reference designate similar parts in the different views.

1 designates the body or weight having at one side of its center of gravity, preferably, a longitudinal hole 2 therethrough.

3 designates a line attaching device or member, preferably resilient wire, and having at one end a projecting U shaped portion 4 one arm 5 of which extends into the hole 2 and is provided with a bend 6 adapted to engage the adjacent end of the weight 1, so as to prevent the wire from slipping in one direction in the hole 2.

The other end of the member 3 is provided with a U shaped portion 7 which projects beyond the adjacent end of the weight, and which has an arm 8 which extends into the hole 2 and has a bend 9 releasably engaging the other end of the weight 1 for holding the member 3 from slipping in the opposite direction in the hole 2.

Preferably the portion 7 is tapering so as to be adapted for easy insertion into the opposite end of the hole 2 when the member 3 is being attached to the weight 1.

The U shaped portion 7 is compressible so as to be movable to a position in which the bend 9 may be disengaged from the adjacent end of the weight 1, upon which the member 3 may be withdrawn from the hole 2.

The inner end of the arm 5 is preferably inwardly turned, as shown in Fig. 2, to permit the easy insertion of the arm in the hole 2.

The hole 2 is oblong, in cross section, and so fitted to the member 3 as to prevent the member 3 turning in the hole.

The portion 4 should be sufficiently wide in diameter to prevent its entering the eye at the end of the fishing pole when the line is reeled up preparatory to casting.

The spinner or fishing hook may be attached to the U shaped portion 7, if desired, by compressing the portion 4 so as to permit the bend 6 to enter the hole 2, at which time the member 3 may be slid in the hole 2 to a position in which the end of the arm 8 will clear the weight 1. The spinner or hook, not shown, may then be slipped onto the arm 8, after which the member 3 is drawn back to the position shown in Fig. 2. The fishing line may be attached to the portion 4 in like manner, if desired, or it may be tied thereto in any convenient manner. By having the hole 2 at one side of the center of gravity of the weight, the latter is held from turning and in turn holds the line from twisting.

I do not limit my invention to the structure shown and described, as modifications, within the scope of the appended claims, may be made without departing from the spirit of my invention.

What I claim is:—

1. In a casting weight, a weight having a longitudinal hole therethrough, and a resilient line attaching device extending through said hole and provided at opposite ends with two arms extending into said hole and having means for releasably engaging opposite ends of said weight for holding said device in said hole.

2. In a casting weight, a weight having a longitudinal hole therethrough, and a wire extending through said hole and having two arms, one at each end, provided with means for releasably engaging opposite ends of the weight to prevent movement in either direction of the wire in said hole, one arm being flexible and adapted to be swung out of engagement with the adjacent end of the weight so as to permit the withdrawal of the wire from the hole.

3. In a casting weight, a weight having a longitudinal hole therethrough, and a resilient wire extending through said hole and having at opposite ends two arms which extend into said hole at opposite ends thereof, each of said arms having a bend adapted to engage the adjacent end of the weight for holding the wire from longitudinal movement in said hole, one of said arms being adapted to be bent to a position in which its bend will be disengaged from the adjacent end of the weight so as to permit the withdrawal of the wire from said hole.

4. In a casting weight, a weight having a longitudinal hole therethrough, and a resilient member extending through said hole and having at opposite ends respectively two projecting U shaped portions releasably engaging respectively opposite ends of said weight, one of said U shaped portions being compressible to a position in which it will be released from the adjacent end of the weight so as to permit the withdrawal of the member from said hole.

5. In a casting weight, a weight having a longitudinal hole therethrough at one side of the center of gravity of said weight, and a resilient member extending through said hole and having at each end a projecting U shaped portion having means for engaging the adjacent end of the weight for holding the member from longitudinal movement in one direction in the weight, one of said U shaped portions being compressible to a position in which it will be released from the adjacent end of the weight so as to permit the withdrawal of the member from said hole.

In testimony whereof I have signed my name to this specification.

SIGEL ARNOLD.